United States Patent
Funatsu et al.

(10) Patent No.: US 9,571,763 B2
(45) Date of Patent: Feb. 14, 2017

(54) SPLIT PIXEL HIGH DYNAMIC RANGE SENSOR

(71) Applicant: OMNIVISION TECHNOLOGIES, INC., Santa Clara, CA (US)

(72) Inventors: Eiichi Funatsu, San Jose, CA (US); Yaowu Mo, San Ramon, CA (US)

(73) Assignee: OmniVision Technologies, Inc., Santa Clara, CA (US)

(*) Notice: Subject to any disclaimer, the term of this patent is extended or adjusted under 35 U.S.C. 154(b) by 21 days.

(21) Appl. No.: 14/554,791

(22) Filed: Nov. 26, 2014

(65) Prior Publication Data

US 2015/0201139 A1 Jul. 16, 2015

Related U.S. Application Data

(60) Provisional application No. 61/925,840, filed on Jan. 10, 2014.

(51) Int. Cl.
*H04N 5/355* (2011.01)
*H04N 5/3745* (2011.01)
*H04N 9/04* (2006.01)

(52) U.S. Cl.
CPC ........ *H04N 5/3559* (2013.01); *H04N 5/37457* (2013.01); *H04N 9/045* (2013.01)

(58) Field of Classification Search
CPC .............. H04N 5/37457; H04N 5/355–5/3559
See application file for complete search history.

(56) References Cited

U.S. PATENT DOCUMENTS

| 2006/0273353 | A1 | 12/2006 | Guidash et al. |
| 2012/0002092 | A1 | 1/2012 | Guidash |
| 2015/0195463 | A1* | 7/2015 | Koh ........................ H04N 5/347 348/302 |

FOREIGN PATENT DOCUMENTS

| TW | 200703634 A | | 1/2007 | |
| TW | 201208054 A | | 2/2012 | |
| WO | WO2013031368 | * | 3/2013 | ............. H04N 5/353 |

OTHER PUBLICATIONS

TW Application No. 104100798—Taiwanese Office Action and Search Report, with English Translation, issued Feb. 22, 2016 (9 pages).

* cited by examiner

*Primary Examiner* — Paul Berardesca
(74) *Attorney, Agent, or Firm* — Blakely Sokoloff Taylor & Zafman LLP

(57) ABSTRACT

A method of reading out a pixel includes photogenerating charge carriers during a single integration time in photodetectors of each one of a plurality of sub-pixels included in the pixel. Each one of the plurality of sub-pixels of the pixel has a same color filter. A floating diffusion node of the pixel is reset. The floating diffusion node is sampled to generate a reset output sample signal. Charge carriers that were photogenerated in a first portion of the plurality of sub-pixels are transferred to the floating diffusion node. The floating diffusion node is sampled to generate a first output sample signal. Charge carriers that were photogenerated in a second portion of the plurality of sub-pixels are transferred to the floating diffusion node. The floating diffusion node is sampled to generate a second output sample signal.

20 Claims, 5 Drawing Sheets

SPLIT PIXEL HIGH DYNAMIC RANGE SENSOR

REFERENCE TO RELATED APPLICATION

This application claims the benefit of U.S. Provisional Application No. 61/925,840, filed Jan. 10, 2014.

BACKGROUND INFORMATION

Field of the Disclosure

The present invention is generally related to image sensors, and more specifically, the present invention is directed to high dynamic range image sensors.

Background

Standard image sensors have a limited dynamic range of approximately 60 to 70 dB. However, the luminance dynamic range of the real world is much larger. Natural scenes often span a range of 90 dB and over. In order to capture the highlights and shadows simultaneously, HDR technologies have been used in image sensors to increase the captured dynamic range. The most common techniques to increase dynamic range is to merge multiple exposures captured with standard (low dynamic range) image sensors into a single linear HDR image, which has much larger dynamic range than a single exposure image.

One of the most common HDR sensor solutions would be having multiple exposures into one single image sensor. With different exposure integration times or different sensitivities (for example by inserting neutral density filters), one image sensor could have 2, 3, 4 or even more different exposures in a single image sensor. Multiple exposure images are available in a single shot using this HDR image sensor. However, overall image resolution is decreased using this HDR sensor compared to a normal full resolution image sensor. For example, for an HDR sensor that combines 4 different exposures in one image sensor, each HDR image would be only a quarter resolution of the full resolution image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1A is a diagram illustrating a portion of an example color pixel array.

FIG. 1B is a diagram illustrating a portion of an example color pixel array in which each pixel includes a plurality of sub-pixels to provide high dynamic range (HDR) imaging in accordance with the teachings of the present invention.

FIG. 4 is a diagram illustrating a portion of another example color pixel array in which each pixel includes a plurality of sub-pixels to provide HDR imaging in accordance with the teachings of the present invention.

Figure 2:
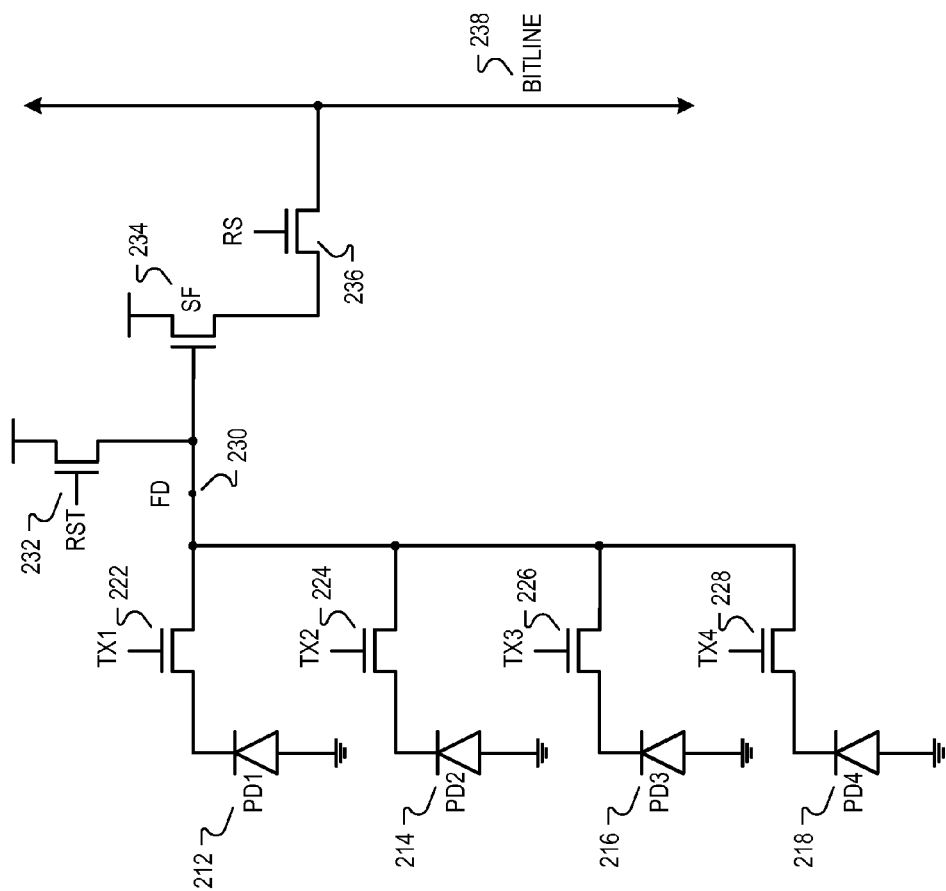
FIG. 2 is a circuit diagram showing the circuitry of a pixel having a plurality of sub-pixels to provide HDR imaging in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe color pixel array in which each pixel includes a plurality of sub-pixels to provide HDR imaging in accordance with the teachings of the present invention. In one example, each pixel is read out after a single integration time or a single exposure, during which time charge carriers are photogenerated in each photodetector of each sub-pixel. After the integration time, each pixel is read out by transferring charge from the photodiodes of a first portion of the plurality of sub-pixels to shared floating diffusion node to generate a first output signal. Then, charge is transferred from the photodiodes of a second portion of the plurality of sub-pixels to the shared floating diffusion node to generate a second output signal. In one example, the first output signal may be utilized for brighter light condition, while the second output signal may be utilized for lower light conditions to realize an HDR imaging sensor in accordance with the teachings of the present invention.

Figures 1A, 1B:
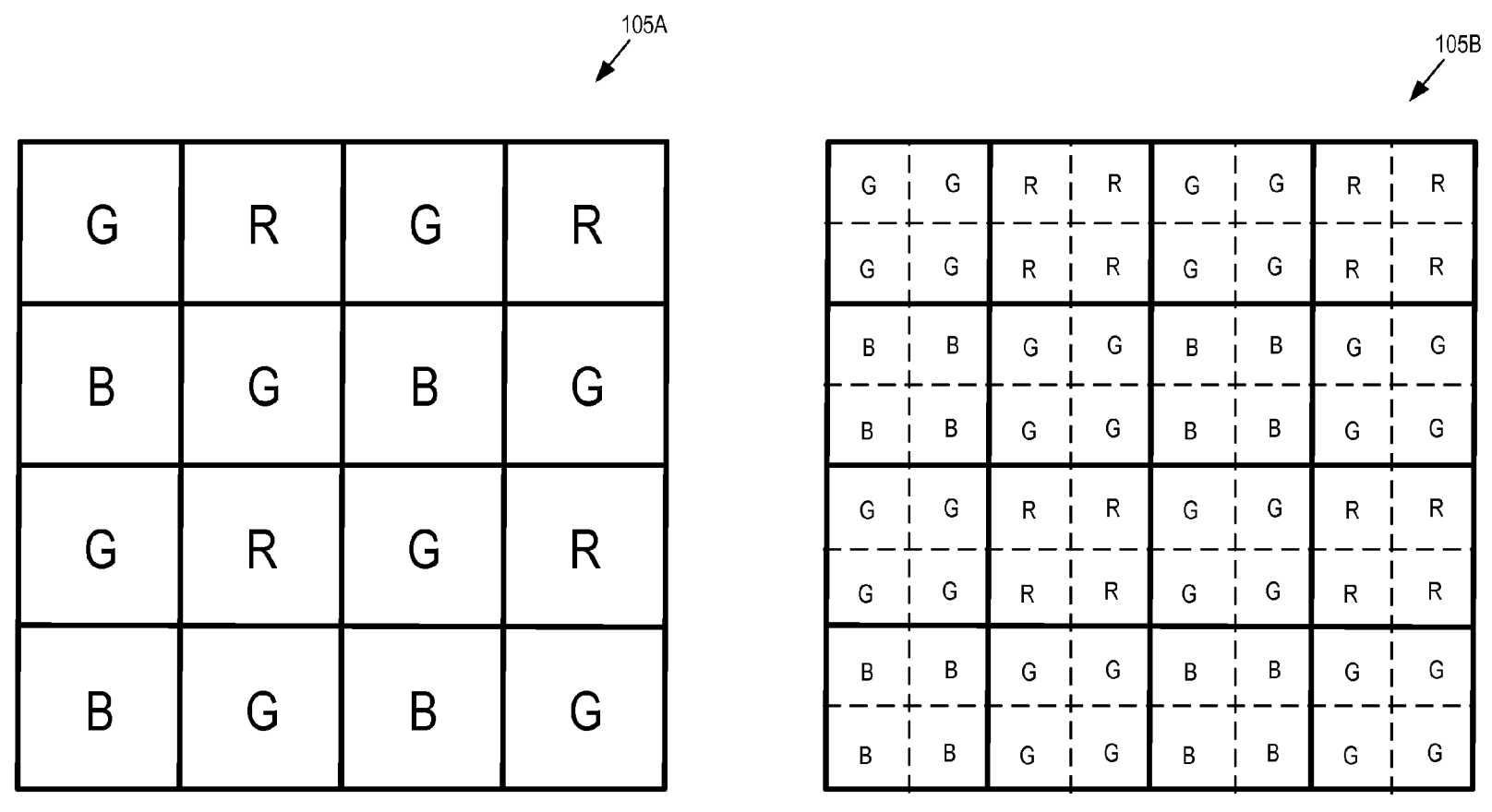

To illustrate, FIG. 1A is a diagram illustrating a portion of an example pixel array 105A. In the depicted example, pixel array 105A is a color pixel array having a Bayer filter pattern in which there are alternating rows of green (G) and red (R) pixels, and blue (B) and green (G) pixels to sense color images.

FIG. 1B is a diagram illustrating a portion of an example pixel array 105B, which is similar to pixel array 105A of FIG. 1A, except that in pixel array 105B of FIG. 1B, each one of the pixels includes a plurality of sub-pixels, all having the same color filter. For instance, as shown in the example depicted in FIG. 1B, each green (G) pixel has a plurality of green (G) sub-pixels, each red (R) pixel has a plurality of red (R) sub-pixels, and each blue (B) pixel has a plurality of blue (B) sub-pixels. In the example, the plurality of sub-pixels for each pixel are arranged in a cluster having the same size as a regular pixel. It is noted that in the specific example illustrated in FIG. 1B, each pixel includes a cluster of 2×2 sub-pixels for explanation purposes. It will be appreciated of course that in other examples, the clusters may have a greater or a fewer number of sub-pixels than the 2×2 sub-pixel clusters illustrated in FIG. 1B in accordance with the teachings of the present invention.

FIG. 2 is a circuit diagram showing the circuitry of a pixel 210 having a plurality of sub-pixels to provide HDR imaging in accordance with the teachings of the present invention. In the specific example depicted in FIG. 2, pixel 210 has four sub-pixels, which in one example may correspond to the 2×2 cluster of sub-pixels illustrated in FIG. 1B above, where each sub-pixel has the same color filter (e.g., red (R), green (G), or blue (B)).

In the example shown in FIG. 2, each of the plurality of sub-pixels of pixel 210 has a separate photodetector and transfer transistor, but all share the same floating diffusion node, reset transistor, amplifier transistor, and row select transistor. Specifically, as shown in the depicted example, a first sub-pixel includes photodetector PD1 212 coupled to a transfer transistor 222 controlled with a TX1 signal, a second sub-pixel includes photodetector PD2 214 coupled to a transfer transistor 224 controlled with a TX2 signal, a third sub-pixel includes photodetector PD3 216 coupled to a transfer transistor 226 controlled with a TX3 signal, and a fourth sub-pixel includes photodetector PD4 218 coupled to a transfer transistor 228 controlled with a TX4 signal. The respective transfer transistors 222, 224, 226, and 228 of all of the plurality of sub-pixels are coupled to the same shared floating diffusion (FD) node 230, which is also coupled to a reset transistor 232 controlled with the RST signal. The floating diffusion (FD) node 230 is also coupled to the control terminal of an amplifier transistor 234, which in FIG. 2 is the source follower (SF) coupled transistor 234 having its gate terminal coupled to the floating diffusion (FD) 230. The row select transistor 236, which is controlled with the RS signal, is coupled between the output source terminal of the source follower (SF) transistor 234 and an output bitline 238 of pixel 210, through which the output signals of pixel 210 are read out in accordance with the teachings of the present invention.

Figure 3:
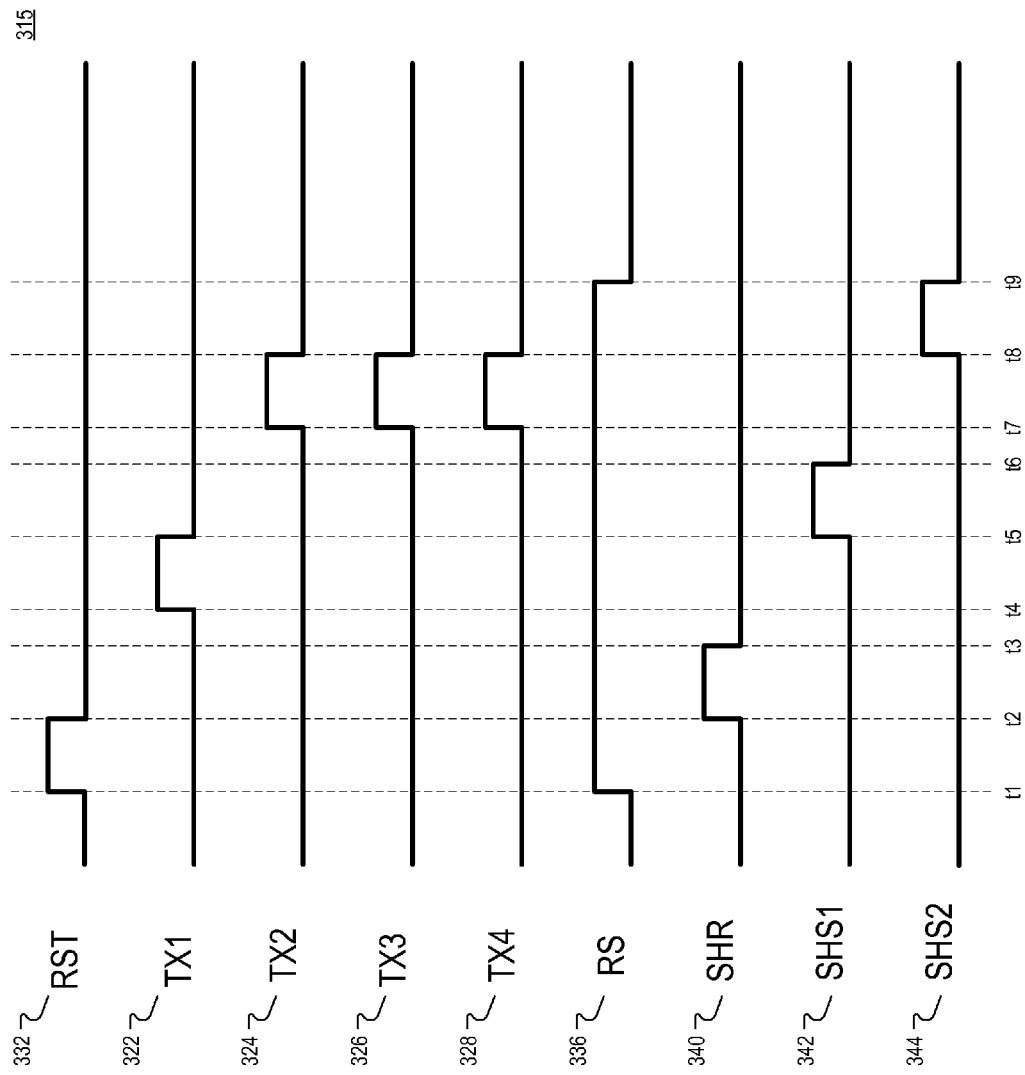
FIG. 3 is a timing diagram illustrating an example relationship of signals found in example circuitry of a pixel having a plurality of sub-pixels to provide HDR imaging in accordance with the teachings of the present invention.

FIG. 3 is a timing diagram 315 illustrating an example relationship of signals found in example circuitry of a pixel, such as for example pixel 210 of FIG. 2, having a plurality of sub-pixels to provide HDR imaging in accordance with the teachings of the present invention. In particular, the example timing diagram 315 of FIG. 3 illustrates one example of reading out at pixel (e.g., pixel 210 of FIG. 2) to realize HDR performance with the same low-light sensitivity of a regular pixel of the same size as a 2×2 cluster in accordance with the teachings of the present invention. For instance, at time t1 the row select (RS) 336 is initiated to begin the read out process and the RST signal 332 is pulsed to reset the floating diffusion (FD) node 230. At time t2, the signal on the floating diffusion (FD) node 230 is sampled with the SHR signal 340 being pulsed to generate a reset output sample signal.

Continuing with the example depicted in FIG. 3, the charge carriers that were photogenerated in a first portion of the plurality of sub-pixels are then transferred to the shared floating diffusion (FD) node 230. In various examples, the first portion of the plurality of sub-pixels may include one or more sub-pixels of the pixel. In the specific example depicted in FIG. 3, the first portion of the plurality of sub-pixels is one pixel, which corresponds to photodetector PD1 212. Accordingly, the TX1 signal 322 is pulsed at time t4 to pulse the gate of the transfer transistor 222 coupled to photodetector PD1 212, which causes the photogenerated charge carriers in photodetector PD1 212 to be transferred to the shared floating diffusion (FD) node 230. At time t5, the signal on the floating diffusion (FD) node 230 is sampled again with the SHS1 signal 342 being pulsed to generate a first output sample signal.

Continuing with the example depicted in FIG. 3, the charge carriers that were photogenerated in a second portion of the plurality of sub-pixels are then transferred to the shared floating diffusion (FD) node 230 to further charge the shared floating diffusion node 230. In various examples, the second portion of the plurality of sub-pixels may include one or more sub-pixels of the pixel. In the specific example depicted in FIG. 3, the second portion of the plurality of sub-pixels is three sub-pixels, or the remaining sub-pixels, which corresponds to photodetectors PD2 214, PD3 216, and PD4 218. Accordingly, the TX2 324, TX3 326, and TX4 328 signals are pulsed at time t7 to pulse the gates of the respective transfer transistors 224, 226, and 228 that are coupled to photodetectors PD2 214, PD3 216, and PD4 218, which causes the photogenerated charge carriers in photodetectors PD2, PD3, and PD4 to be transferred to the shared floating diffusion (FD) node 230 to further charge the floating diffusion (FD) node 230. At time t8, the signal on the floating diffusion (FD) node 230 is then sampled again with the SHS2 signal 344 being pulsed to generate a second output sample signal.

Accordingly, in bright light conditions, a first output signal can be determined based on the difference between the reset output sample signal and the first output sample signal. In other words, a first output signal equal to the reset output sample signal minus the first output sample signal may be used for bright light conditions in accordance with the teachings of the present invention. In low light conditions, a second output signal can be determined based on the difference between the reset output sample signal and the second output sample signal. In other words, a second output signal equal to the reset output sample signal minus the second output sample signal may be used for low light conditions in accordance with the teachings of the present invention.

Therefore, it is appreciated that HDR imaging is realized using the above described structures and techniques by using the same single integration time or single exposure on the pixels and sub-pixels, which therefore achieves an increase in the dynamic range of the pixel without suffering from ghosting or light flickering issues caused by multiple exposures in accordance with the teachings of the present invention.

Figure 4:
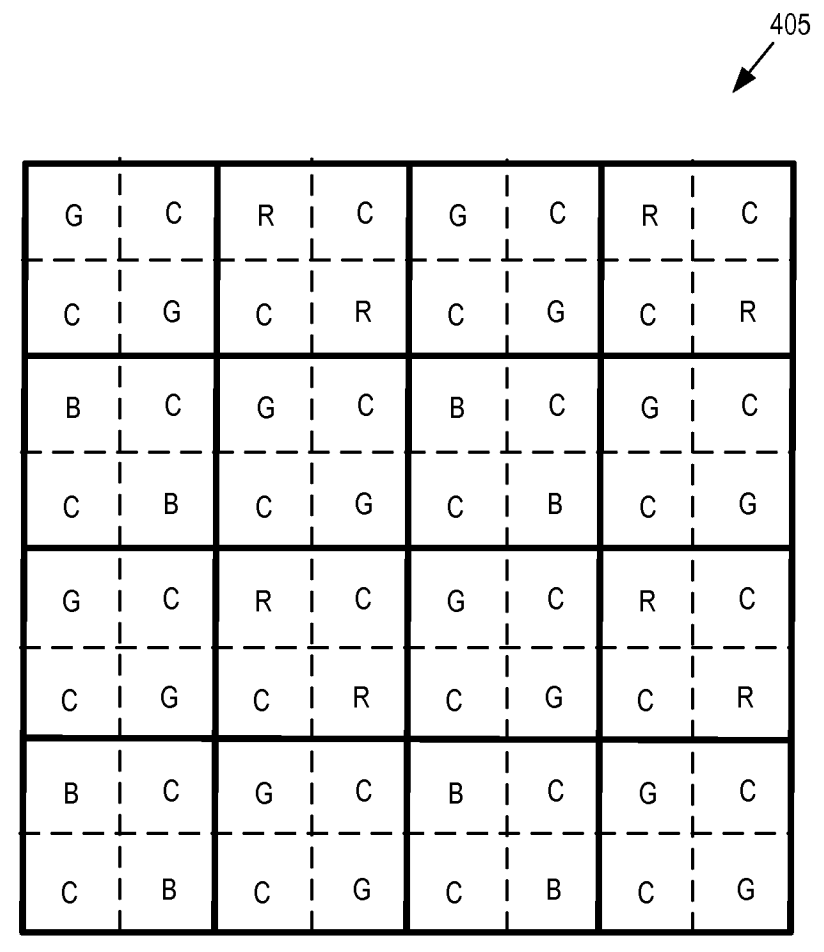

FIG. 4 is a diagram illustrating a portion of another example color pixel array 405 in which each pixel includes a plurality of sub-pixels to provide HDR imaging in accordance with the teachings of the present invention. It is appreciated that color pixel array 405 of FIG. 4 shares many similarities with color pixel array 105B of FIG. 1B. One difference is that each pixel in color pixel array 405 includes clear (C) sub-pixels. For instance, in color pixel array 405, two diagonal sub-pixels for each pixel are changed to clear (C) pixels as shown. In one example, it is appreciated that two pairs of cross-diagonal sub-pixels can be summed together to provide a fast summing/binning sensor output. In the example, there can be one RGB plan from the RBG pixels and 1 mono-plane from the clear pixels. In one example, the center of these two planes may be overlapped exactly. In one example, a sensor utilizing color pixel array 405 can provide advanced HDR features by adjusting the exposure times of clear (C) pixels and the RGB pixels, as well as by adjusting the analog gain of clear (C) pixels and the RGB pixels in accordance with the teachings of the present invention. In one example, the dynamic range can be further increased with an RGBC pixel, such as for example shown in FIG. 4 with the sensitivity of clear (C) pixels compared to the RGB pixels greater than 2.0.

Figure 5:
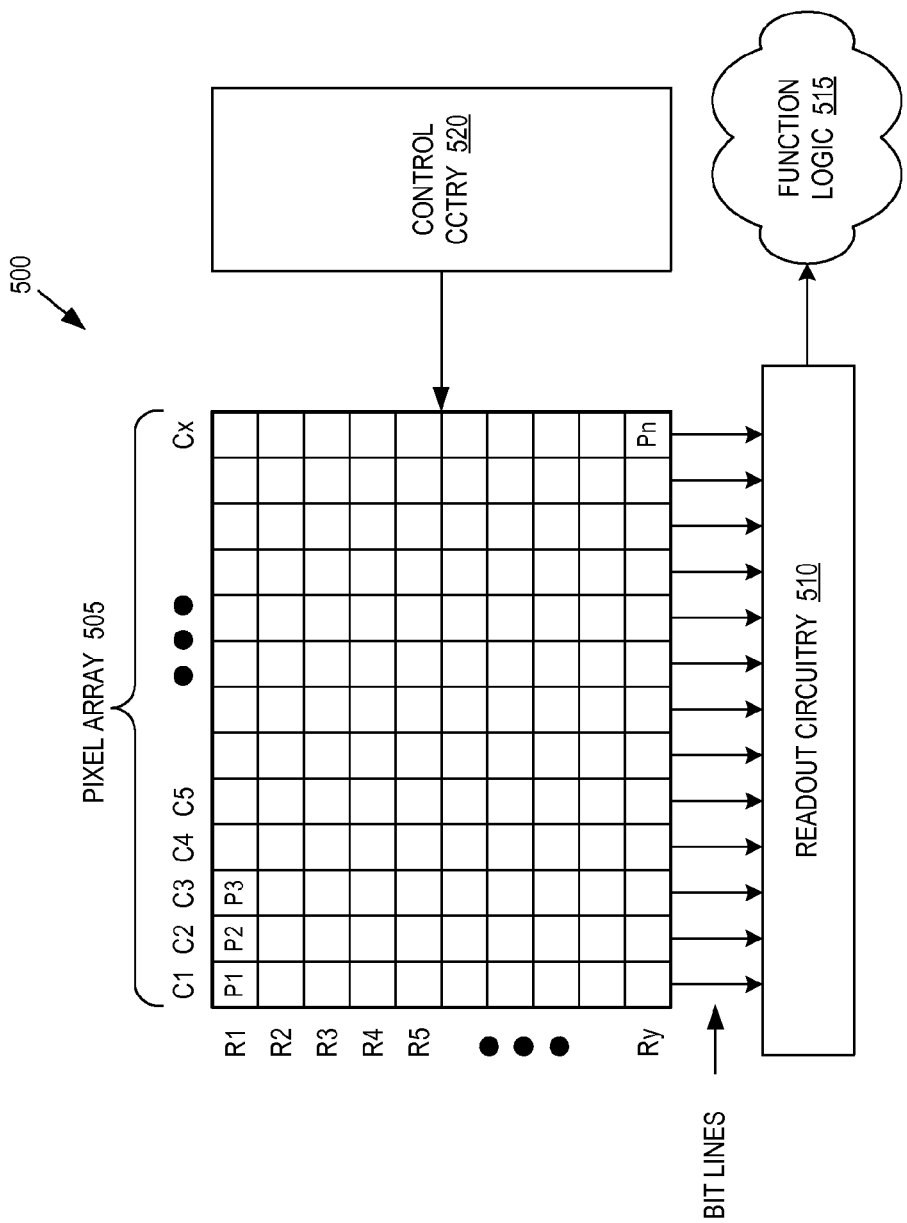
FIG. 5 is a diagram illustrating one example of an imaging system including a color pixel array in which each pixel includes a plurality of sub-pixels in accordance with the teachings of the present invention.

FIG. 5 is a diagram illustrating one example of an imaging system 500 including a color pixel array 505 in which each pixel includes a plurality of sub-pixels in accordance with the teachings of the present invention. As shown in the depicted example, imaging system 500 includes pixel array 505 coupled to control circuitry 520 and readout circuitry 510, which is coupled to function logic 515.

In one example, pixel array 505 is a two-dimensional (2D) array of image sensor pixel cells (e.g., pixels P1, P2, P3, Pn). It is noted that the pixel cells P1, P2, Pn in the pixel array 505 may be examples of color pixel array 105B of FIG. 1B or color pixel array 405 of FIG. 4, and that similarly named and numbered elements referenced below are coupled and function similar to as described above. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell P1, P2, P3, Pn has acquired its image data or image charge, the image data is readout by readout circuitry 510 and then transferred to function logic 515. In various examples, readout circuitry 510 may include amplification circuitry, analog-to-digital (ADC) conversion circuitry, or otherwise. Function logic 515 may simply store the image data or even manipulate the image data by applying post image effects (e.g., crop, rotate, remove red eye, adjust brightness, adjust contrast, or otherwise). In one example, readout circuitry 510 may readout a row of image data at a time along readout column lines (illustrated) or may readout the image data using a variety of other techniques (not illustrated), such as a serial readout or a full parallel readout of all pixels simultaneously.

In one example, control circuitry 520 is coupled to pixel array 505 to control operational characteristics of pixel array 505. In one example, control circuitry 520 is coupled to generate a global shutter signal for controlling image acquisition for each pixel cell. In the example, the global shutter signal simultaneously enables all pixels cells P1, P2, P3, Pn within pixel array 505 to simultaneously enable all of the pixel cells in pixel array 505 to simultaneously transfer the image charge from each respective photodetector during a single acquisition window.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A method of acquiring image data from a pixel from a single exposure of a single image capture in a high dynamic range (HDR) image sensor, comprising:
    photogenerating charge carriers during a single integration time in photodetectors of each one of a plurality of sub-pixels included in the pixel, wherein each one of the plurality of sub-pixels of the pixel has a same color filter;
    resetting a shared floating diffusion of the pixel;
    sampling the shared floating diffusion to generate a reset output sample signal;
    transferring charge carriers that were photogenerated in a first portion of the plurality of sub-pixels to the shared floating diffusion;
    sampling the shared floating diffusion to generate a first output sample signal;
    transferring charge carriers that were photogenerated in a second portion of the plurality of sub-pixels to the shared floating diffusion, wherein said transferring the charge carriers that were generated in the first portion and said transferring the charge carriers that were generated in the second portion occur at different times; and
    sampling the shared floating diffusion to generate a second output sample signal.

2. The method of claim 1 further comprising determining a first correlated double sampling image signal output value of the single integration time by finding a difference between the reset output sample signal and the first output sample signal.

3. The method of claim 2 further comprising utilizing the first correlated double sampling image signal output value for bright light conditions.

4. The method of claim 1 further comprising determining a second correlated double sampling image signal output value of the single integration time by finding a difference between the reset output sample signal and the second output sample signal.

5. The method of claim 4 further comprising utilizing the second correlated double sampling image signal output value for low light conditions.

6. The method of claim 1 wherein transferring charge carriers that were photogenerated in the first portion of the plurality of sub-pixels to the shared floating diffusion comprises transferring the charge carriers from one or more photodiodes of the first portion of the plurality of sub-pixels to the shared floating diffusion to generate the first output signal.

7. The method of claim 1 wherein transferring charge carriers that were photogenerated in the second portion of the plurality of sub-pixels to the shared floating diffusion comprises transferring the charge carriers from one or more photodiodes of the second portion of the plurality of sub-pixels to the shared floating diffusion to generate the second output signal.

8. A pixel for use in a high dynamic range (HDR) image sensor, comprising:
a plurality of sub-pixels, wherein the plurality of sub-pixels includes one or more clear filters and one or more color filters, and wherein each one of the plurality of sub-pixels includes:
a photodetector to photogenerate image charge carriers in response to incident light during a single integration time of a single image capture; and
a transfer transistor coupled to the photodetector;
a shared floating diffusion coupled to the plurality of sub-pixels,
wherein one or more transfer transistors of a first portion of the plurality of sub-pixels are coupled to selectively transfer image charge carriers photogenerated in respective photodetectors of the first portion of the plurality of sub-pixels to the shared floating diffusion, and
wherein one or more transfer transistors of a second portion of the plurality of sub-pixels are coupled to selectively transfer image charge carriers photogenerated in respective photodetectors of the second portion of the plurality of sub-pixels to the shared floating diffusion,
wherein said one or more transfer transistors of the first portion and said one or more transfer transistors of the second portion are coupled to selectively transfer the image charge carriers at different times.

9. The pixel of claim 8 further comprising a reset transistor coupled to the shared floating diffusion to reset the shared floating diffusion node.

10. The pixel of claim 9 further comprising an amplifier transistor having a gate terminal coupled to the shared floating diffusion, wherein the amplifier transistor is coupled to generate a reset output signal after the shared floating diffusion is reset by the reset transistor.

11. The pixel of claim 10 wherein the amplifier transistor is further coupled to generate a first output signal after the image charge carriers of the first portion of the plurality of sub-pixels are transferred to the shared floating diffusion.

12. The pixel of claim 11 wherein the amplifier transistor is further coupled to generate a second output signal after the image charge carriers of the second portion of the plurality of sub-pixels are transferred to the shared floating diffusion.

13. The pixel of claim 11 further comprising a row select transistor coupled to the amplifier transistor to selectively generate the reset, first, and second output signals to an output bitline of the pixel.

14. A high dynamic range (HDR) imaging system, comprising:
a pixel array of pixels, wherein each one of the pixels includes:
a plurality of sub-pixels, wherein each one of the plurality of sub-pixels has a same color filter, and wherein each one of the plurality of sub-pixels includes:
a photodetector to photogenerate image charge carriers in response to incident light during a single integration time of a single image capture; and
a transfer transistor coupled to the photodetector;
a shared floating diffusion coupled to the plurality of sub-pixels, wherein one or more transfer transistors of a first portion of the plurality of sub-pixels are coupled to selectively transfer image charge carriers photogenerated in respective photodetectors of the first portion of the plurality of sub-pixels to the shared floating diffusion, and wherein one or more transfer transistors of a second portion of the plurality of sub-pixels are coupled to selectively transfer image charge carriers photogenerated in respective photodetectors of the second portion of the plurality of sub-pixels to the shared floating diffusion, wherein said one or more transfer transistors of the first portion and said one or more transfer transistors of the second portion are coupled to selectively transfer the image charge carriers at different times;
control circuitry coupled to the pixel array to control operation of the pixel array; and
readout circuitry coupled to the pixel array to readout image data from the plurality of pixels.

15. The HDR imaging system of claim 14 further comprising function logic coupled to the readout circuitry to store the image data from each one of the plurality of pixels.

16. The HDR imaging system of claim 14 wherein each one of the plurality of pixels further comprises a reset transistor coupled to the shared floating diffusion to reset the shared floating diffusion node.

17. The HDR imaging system of claim 16 wherein each one of the plurality of pixels further comprises an amplifier transistor having a gate terminal coupled to the shared floating diffusion, wherein the amplifier transistor is coupled to generate a reset output signal after the shared floating diffusion is reset by the reset transistor.

18. The HDR imaging system of claim 17 wherein the amplifier transistor is further coupled to generate a first output signal after the image charge carriers of the first portion of the plurality of sub-pixels are transferred to the shared floating diffusion.

19. The HDR imaging system of claim 18 wherein the amplifier transistor is further coupled to generate a second output signal after the image charge carriers of the second portion of the plurality of sub-pixels are transferred to the shared floating diffusion.

20. The HDR imaging system of claim 19 wherein each one of the plurality of pixels further comprises a row select transistor coupled to the amplifier transistor to selectively generate the reset, first, and second output signals to an output bitline of the pixel.

* * * * *